S. P. GROOCOCK.

TESSELLATED FLOOR.

No. 7,293. Reissued Sept. 5, 1876.

WITNESSES:

W. W. Hollingsworth

Solon C. Kemon

INVENTOR:

S. P. Groocock

BY

Munn & Co.

ATTORNEYS.

UNITED STATES PATENT OFFICE.

SAMUEL P. GROOCOCK, OF NEW YORK, N. Y.

IMPROVEMENT IN TESSELLATED FLOORS.

Specification forming part of Letters Patent No. 178,141, dated May 30, 1876; reissue No. 7,293, dated September 5, 1876; application filed August 22, 1876.

DIVISION A.

*To all whom it may concern:*

Be it known that I, SAMUEL P. GROOCOCK, of the city, county, and State of New York, have invented a new and useful Improvement in Tessellated Floors; and I do hereby declare that the following is a full, clear, and exact description of the same.

In order to give tessellated flooring the desired firmness, solidity, and permanency, and at the same time avoid the use of thick blocks or pieces, which would greatly increase its cost, it has been the practice to connect the edges of the pieces by tongue and groove, and to lay them upon a foundation composed of numerous strips or timbers, or, more commonly, of a plastic cementitious material. The various imperfections or objectionable features of this and similar modes of laying marquetry-floors have led to the development of my present invention, which consists in forming composite flooring blocks or sections of a number of wooden pieces of the desired or requisite sizes, shapes, and colors, and a backing of asphalt, the two parts being firmly united by a dovetail or equivalent connection, as hereinafter described. A flooring-block so made up may be handled, transported, and laid in much the same manner as tiles are, so that the labor, time, and expense ordinarily incident to laying marquetry-floors are considerably lessened.

Figure 1:
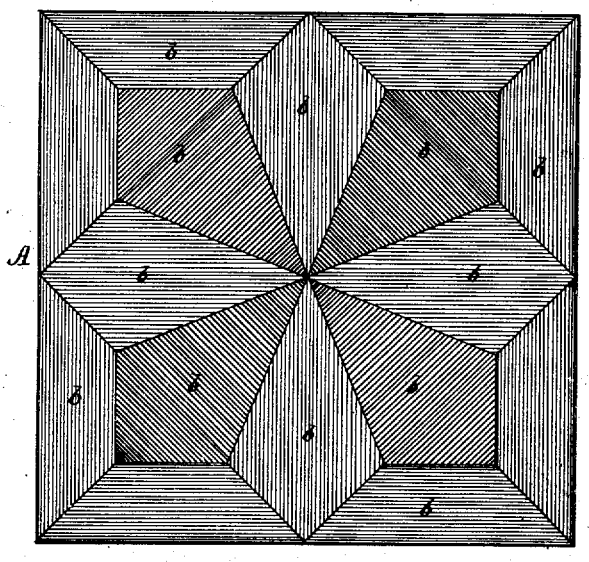
Figure 2:
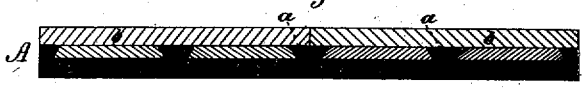
Figure 3:
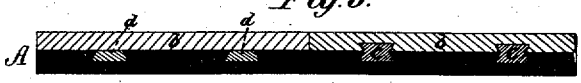

In the accompanying drawing, forming part of this specification, Figure 1 is a plan view of the flooring-block; Fig. 2, a cross-section. Fig. 3 shows a modification of the means of connecting the face and backing.

A indicates the flooring block or section, composed of pieces of various sizes, forms, and colors. In constructing the same I first cut out the several pieces *b*, in the ordinary manner, but in place of providing them with the ordinary tongue and groove on the edge, which considerably increases the cost of the flooring, I simply glue the sides of the pieces *b* together, and then, by aid of suitable machinery, I cut one or more dovetail grooves across the entire composite block or section A at one operation. The requisite quantity of asphalt, heated sufficiently to impart a good degree of plasticity, is then poured over the back of block A, and allowed to cool, when it will closely adhere and assume the hardness and rigidity necessary to form a firm backing or support for the pieces *b* and bind them together in one solid block. In such case the asphalt enters the dovetail grooves cut in the flooring-block A, thus forming tongues *a*. In some instances, I cut a plain or square-angled groove in place of a dovetail. As a modification of this mode of connection, I may insert double-dovetail wooden strips *c* in the several grooves of the section A, in which case that portion of the strip projecting from the back will be firmly embedded in the asphalt. Another mode of connection is to dispense with grooving the back of the block A, and attach a wooden dovetail strip, *d*, to the same by means of screws, the strip being embedded in the asphalt, as in the other case.

To form the complete tessellated or marquetry flooring, the blocks or sections A, composed of the wooden pieces and asphalt backing, are laid upon a plastic bed of cementitious material. This operation may be effected with accuracy, ease, and dispatch, and the flooring thus formed has all the qualities held desirable in this class to which it belongs, among which are great solidity, firmness, and durability, capacity to resist attacks of wood-borers and rodents, to prevent unhealthy exhalations from the earth permeating the apartment from below; also, very slight capacity to absorb moisture, whence results absence of swelling, warping, or shrinking.

Having thus described my invention, what I claim is—

The composite block or section A, for marquetry-flooring, formed of pieces *b*, arranged in a suitable design or pattern, and the asphalt backing B, the same being connected as shown and described.

SAML. P. GROOCOCK.

Witnesses:

S. B. GOODALE,

E. D. GRANT.